US012807425B2

(12) United States Patent
Bossert

(10) Patent No.: US 12,807,425 B2
(45) Date of Patent: Nov. 24, 2026

(54) INSTALLATION FOR ACCUMULATING AND TRANSFERRING PRODUCTS

(71) Applicant: SIDEL PARTICIPATIONS, Octeville-sur-Mer (FR)

(72) Inventor: Nicolas Bossert, Reichstett (FR)

( * ) Notice: Subject to any disclaimer, the term of this patent is extended or adjusted under 35 U.S.C. 154(b) by 91 days.

(21) Appl. No.: 18/623,414

(22) Filed: Apr. 1, 2024

(65) Prior Publication Data

US 2024/0336444 A1 Oct. 10, 2024

(30) Foreign Application Priority Data

Apr. 6, 2023 (FR) ....................................... 2303438

(51) Int. Cl.

| | |
|---|---|
| ***B65G 47/71*** | (2006.01) |
| ***B65G 47/08*** | (2006.01) |
| ***B65G 47/51*** | (2006.01) |
| ***B65G 47/69*** | (2006.01) |

(52) U.S. Cl.

CPC ......... *B65G 47/715* (2013.01); *B65G 47/088* (2013.01); *B65G 47/5113* (2013.01); *B65G 47/69* (2013.01); *B65G 2201/0244* (2013.01)

(58) Field of Classification Search

CPC .. B65G 47/088; B65G 47/30; B65G 47/5113; B65G 47/682; B65G 47/69; B65G 47/71; B65G 47/715

See application file for complete search history.

(56) References Cited

U.S. PATENT DOCUMENTS

| | | | | |
|---|---|---|---|---|
| 11,767,177 B2 * | 9/2023 | Berger | .................... | B65G 47/71 198/370.01 |
| 2015/0037126 A1 * | 2/2015 | Parker | .................... | B65G 47/32 414/815 |
| 2021/0395021 A1 * | 12/2021 | Demel | ................. | B65G 47/082 |
| 2022/0177236 A1 * | 6/2022 | Schuesslburner | .. | B65G 47/5109 |

FOREIGN PATENT DOCUMENTS

| | | |
|---|---|---|
| FR | 2988709 A1 | 10/2013 |
| FR | 3004172 A1 | 10/2014 |
| FR | 3075769 A1 | 6/2019 |
| FR | 3088917 A1 | 5/2020 |

OTHER PUBLICATIONS

French Search Report dated Oct. 4, 2023 for FR2303438.
Gebo Cermex "AQFlex" Internet https://www.sidel.com/cgi-bin/downloads/aqflex_en_2018.pdf dated Sep. 8, 2017.
Gebo Cermex "AQFlex at drinktec 2017" YouTube https://www.youtube.com/watch?v=Dgi5czDDfLI dated Sep. 13, 2017.

* cited by examiner

*Primary Examiner* — Gene O Crawford
*Assistant Examiner* — Keith R Campbell

(57) ABSTRACT

An installation for accumulating and transferring products including a device having an upstream conveying system and at least two downstream conveying systems emerging longitudinally in a hold zone, at least one output conveyor, an accumulation surface, and transfer means. In example embodiments, at least two batches of products, which are formed successively by a division system and sent, for one of them, on one of the downstream conveying systems and, for the other, on the other downstream conveying system, arrive substantially at the same moment at said hold zone. Methods for accumulating and transferring products in a packaging line are also disclosed.

18 Claims, 5 Drawing Sheets

INSTALLATION FOR ACCUMULATING AND TRANSFERRING PRODUCTS

CROSS-REFERENCE TO RELATED APPLICATION

This application claims priority to French application serial number 2303438 filed on Apr. 6, 2023, the entirety of which is incorporated herein by reference

FIELD OF THE INVENTION

The present invention relates to the field of the conveying of products in an industrial processing line, and its subject, on the one hand, is an installation for accumulating and transferring products, and, on the other hand, a method implementing this installation, namely a method for accumulating and transferring products for a reception surface.

BACKGROUND

In this field, the products, which can be bottles, cans, flasks, boxes, cases, cardboard boxes, bundles, or the like, are conveyed between successive processing stations using conveyors that are essentially of endless belt type. The products travel in a single-file flow, in a multi-file flow, or even loose.

In order to have a complete line that is capable of continuously producing despite stoppages or changes of rate of the various stations, for different reasons such as faults or lacks of consumable, it is necessary to have accumulation solutions between the stations, which accommodate the products processed by the station upstream while the station downstream cannot operate, and/or which supply the station downstream with products to be processed while the station upstream cannot operate.

The patent EP3112298 is known, which proposes transversely transferring two longitudinal batches of products from an input zone to a reception surface. The device as described necessitates the installation of a buffer conveying means between the input conveyor and the reception surface, as well as the use of two distinct tools for the transfer to the reception surface. In fact, a first tool of thruster type ensures the transfer from an input conveyor to the buffer conveying means and a second tool is responsible for the transferring of the batches from the buffer conveying means to the reception surface. In this way, it is possible to stop the products on the buffer conveyor during their transfer while allowing a flow of products to travel on the input conveyor. The cycle time for each transfer is therefore made longer and the rate of the production of the line is thereby impacted. Moreover, simultaneously transferring two batches of products necessitates either the insertion of an additional waiting zone between the input conveyor and the buffer conveyor, or the stoppage of the production line. This waiting zone increases the footprint of the device.

There is therefore a need in the current state of the art for an accumulation solution of high capacity, that is not complex, which makes it possible to process products at high speed, without slowing down the packaging line, while limiting the risks to the products upon their entry onto the reception surface. It is also desirable to limit the bulk of such a solution.

SUMMARY

To do this, an installation is proposed comprising at least two distinct traffic lanes for successive batches of products, at least two of said lanes having different path lengths from an upstream conveying system to a hold zone. In this way, batches of products, formed even so in succession on each of the lanes, arrive substantially at the same moment in the hold zone.

To this end, the invention essentially proposes successively diverting a single-file flow of products in batch form from an upstream conveying system to one of the downstream conveying systems by means of a division system, each of the downstream conveying systems having a lane specifically for the travel of products between the division system and the product hold zone. Furthermore, for at least two downstream conveying systems, one of the downstream conveying systems is significantly longer than the other downstream conveying system.

The use of multiple distinct traffic lanes between a division system and a hold zone, one lane being specific to each of the conveying systems of the installation, contributes to synchronizing the arrival of the products at the hold zone, for their transfer to the accumulation surface. In particular, for at least two downstream conveying systems, one of the downstream conveying systems is significantly longer than the other downstream conveying system, so that at least two batches of products formed successively by the division system and sent, for one of them, on one of the downstream conveying systems and, for the other, on the other downstream conveying system, arrive substantially at the same moment at said hold zone. Thus, products diverted by the division system in batch form onto one downstream conveying system will have a path to be covered with a distance that is different from the products diverted in batch form onto the other downstream conveying system.

The products, each travelling respectively on one of the downstream conveying systems in batch form, arrive substantially at the same moment at the hold zone, and it is no longer necessary to alternately clear the batches thus formed from each of the downstream conveying systems.

In other words, with the arrival of the batches on each of the downstream conveying systems of the installation at the hold zone taking place substantially at the same moment, it is possible to simultaneously and easily transfer to the accumulation surface several adjacent batches of products, each of the batches being located on one of the downstream conveying systems, even not separated by a dead plate.

Advantageously, the invention makes it possible to simultaneously transfer at least two adjacent batches of products from the hold zone to the accumulation surface, the installation comprising at least two downstream conveying systems.

Furthermore, the use of at least two traffic lanes which have different distances to be covered for the products in batch form makes it possible to have a cycle time, that is to say transfer time, that is very short while being very efficient.

The time of arrival between at least two batches of products can be small, even zero, when the arrival of the single-file flows of products is synchronized so as to allow an arrival of the batches at the same time on the at least two downstream conveying systems of the installation at the hold zone.

The invention thus aims to provide an installation for accumulating and transferring products that is simple, compact and efficient and to provide the method associated with this installation.

To this end, the first subject of the invention is an installation for accumulating and transferring products, comprising:

- a device for conveying said products in a single-file flow, said device comprising an upstream conveying system, at least two downstream conveying systems emerging longitudinally in a hold zone, and a division system for sending from said upstream conveying system successively to one of the downstream conveying systems at least one first single-file flow of products in batch form to a downstream conveying system and at least one second single-file flow of products in batch form to another downstream conveying system,
- at least one output conveyor of said products,
- an accumulation surface for receiving the products in batch form from the hold zone, said surface being situated between said conveying device and said at least one output conveyor,
- a transfer means for transversely displacing at least one batch of products, on the one hand, from at least one downstream conveying system at the hold zone to said accumulation surface and, on the other hand, from said surface to said at least one output conveyor.

According to the invention, the installation is characterized in that, for at least two downstream conveying systems, between the division system and the hold zone, the length of one downstream conveying system is greater than the length of at least one other downstream conveying system, so that at least two batches of products formed successively by the division system and sent, for one of them, on one of the downstream conveying systems and, for the other, on the other downstream conveying system, arrive substantially at the same moment at said hold zone.

In embodiments, the installation comprises at least three downstream conveying systems, and each of the downstream conveying systems has a different length, so that all the batches of products formed successively by the division system arrive substantially at the same moment at the hold zone.

In embodiments, the installation comprises two downstream conveying systems and the division system is able to send, from said upstream conveying system, successively and alternately, a first single-file flow of products in batch form to a downstream conveying system and a second single-file flow of products in batch form to the other downstream conveying system, so that two batches of products formed successively by the division system arrive substantially at the same moment at said hold zone.

According to additional, nonlimiting features, the downstream conveying systems are U-shaped.

In embodiments, the division system is a controlled deflector which successively and alternately diverts a determined number of products together forming a batch onto the downstream conveying systems.

According to a possible additional feature, the transfer means comprises at least two walls for simultaneously transferring, from the hold zone to the accumulation surface, at least two longitudinal batches of products, each of the batches being situated on one of the downstream conveying systems.

In embodiments, the transfer means comprises an input means and an output means, said input means being configured to transversely transfer a batch of products from at least one downstream conveying system in the hold zone to the accumulation surface and said output means being configured to transversely transfer at least one batch of products from the accumulation surface to at least one output conveyor.

In embodiments, the transfer means comprises a plurality of thrusters, each thruster being able to transfer a batch of products from at least one downstream conveying system to at least one output conveyor by crossing the accumulation surface.

According to a possible additional feature, the downstream conveying systems each have at least one drive motor which is specific to it.

In embodiments, at least one downstream conveying system comprises two conveyor belts, one following the other, each of the two belts having a drive motor which is specific to it, so that the conveying speeds of the two successive belts can be different.

Also a subject of the invention is a method for accumulating and transferring products in a packaging line comprising the following steps:

- receiving a single-file flow of products at an upstream conveying system, then;
- distributing the single-file flow of products successively on at least two downstream conveying systems in longitudinal batch form;
- bringing said batches into a hold zone using said downstream conveying systems;
- slowing down said downstream conveying systems at the hold zone to slow down the products therein;
- transferring a batch of products from at least one downstream conveying system at said hold zone to said accumulation surface;
- transferring at least one batch of products from said accumulation surface to at least one output conveyor.

The method is characterized in that, for at least two downstream conveying systems, the path to bring a batch into the hold zone is longer for one downstream conveying system than for the other downstream conveying system, so as to synchronize the arrival in the hold zone of two successive batches, each travelling respectively on a downstream conveying system.

The method according to one aspect of the invention can have one or more additional features from among the following, considered individually or according to all technically possible combinations.

In embodiments, the transfer of a batch from at least one downstream conveying system at the hold zone to the accumulation surface is performed by an input tool and the transfer of at least one batch of products from the accumulation surface to at least one output conveyor is performed by an output tool.

In embodiments, the transfer between, on the one hand, at least one downstream conveying system at the hold zone to the accumulation surface and, on the other hand, from said surface to said at least one output conveyor, is performed by a transfer means, said transfer means comprising a plurality of thrusters, each thruster transferring at least one batch of products from at least one downstream conveying system at the hold zone to said surface, having said surface crossed by said at least one batch of products and then transferring said at least one batch of products from said surface to at least one output conveyor.

According to a possible additional feature, at least two batches of products are transferred simultaneously, each from one of the downstream conveying systems at said hold zone to the accumulation surface.

In embodiments, the successive batches, each travelling on one of the downstream conveying systems, have the same conveying speed.

BRIEF DESCRIPTION OF THE FIGURES

The invention will be better understood from the following description, which is based on possible embodiments, explained in an illustrative and nonlimiting manner, with reference to the attached figures.

DETAILED DESCRIPTION

Figure 1:
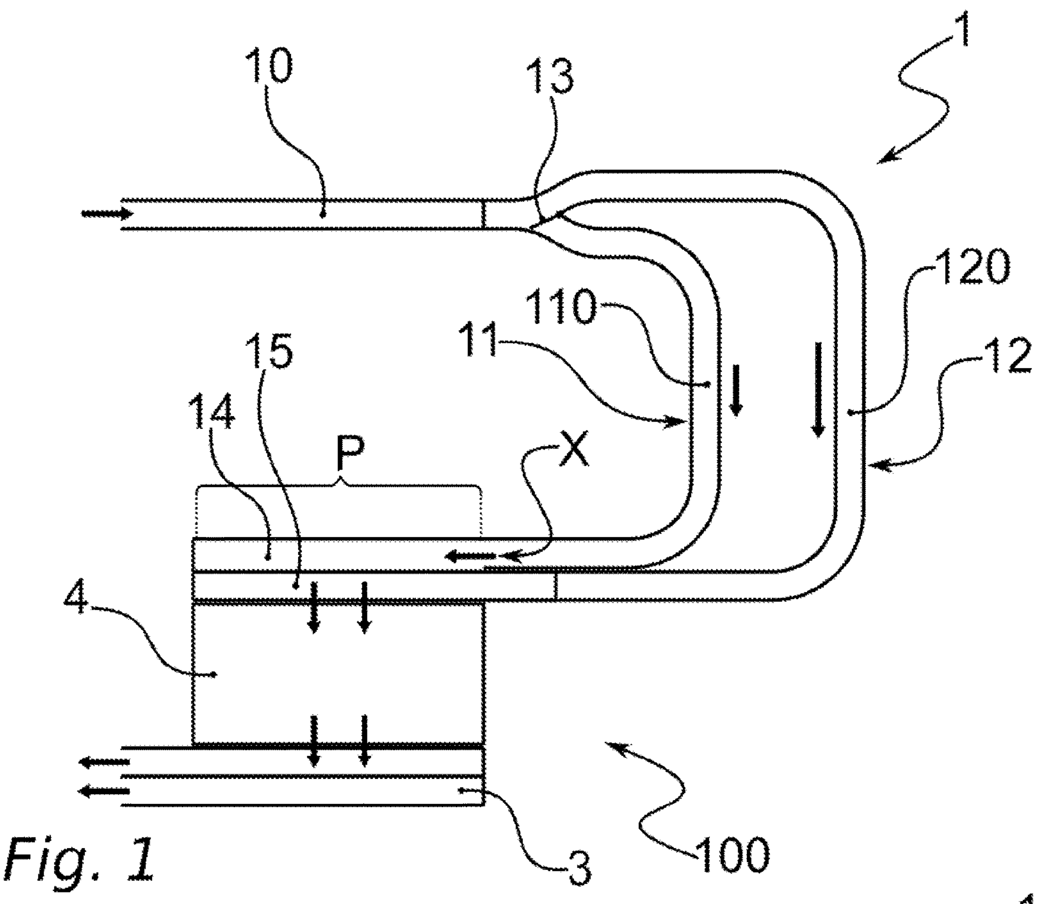
FIG. 1 schematically represents a top view of an embodiment of an installation, notably showing two downstream conveying systems, one downstream conveying system being longer than the other downstream conveying system.

Hereinafter in the description, elements that have an identical structure or analogous functions will be designated by the same reference.

The invention relates first of all to an installation 100 for accumulating and transferring products 2. The products 2, of bottle, flask, case, cardboard box type, are conveyed between different processing stations within a packaging line, for example by conveyor belts on which they rest. The products 2 can all be oriented in the same way, or not.

The installation 100 comprises a device 1 for conveying products 2 in a single-file flow. A single-file flow is understood to mean travel whereby the products 2 are conveyed in a line that is a single product 2 wide.

The conveying device 1 comprises an upstream conveying system 10, at least two downstream conveying systems 11, 12 emerging longitudinally in a hold zone P and a division system 13.

FIG. 1 shows an embodiment in which the installation 100 comprises two downstream conveying systems 11, 12, the downstream conveying system 12 having a greater length than the downstream conveying system 11, between the division system 13 and the hold zone P.

As illustrated in FIG. 1, the products 2 travel from an upstream conveying system 10, and pass through a division system 13. The direction of displacement of the products 2 is represented by arrows.

The division system 13 diverts at least one first single-file flow of products 2 in batch form to one of the at least two downstream conveying systems 11, 12. Thus, a first group of products 2, said group forming a batch, travels on one of the downstream conveying systems 11, 12, from the division system 13 to the hold zone P. The division system 13 next diverts at least one second single-file flow of products 2 in batch form to another downstream conveying system 11, 12.

A batch of products 2 comprises a determined number of products 2, forming a line that is a single product 2 wide. In other words, a batch is a group of successive products, one behind the other, obtained by sequencing performed by the division system 13 of the single-file flow of products 2 coming from the upstream conveying system 10. At the hold zone P, the batch of products extends longitudinally on a downstream conveying system 11, 12.

The division system 13 diverts at least one first group of products 2 in batch form to one of the downstream conveying systems 11, 12 then at least one second group of products 2 in batch form to another downstream conveying system 11, 12.

In embodiments in which the installation 100 comprises at least three downstream conveying systems 11, 12, the division system 13 diverts a third group of products 2 onto a third downstream conveying system, then a fourth group of products 2 onto a fourth downstream conveying system, and so on, as many times as necessary, that is to say on as many downstream conveying systems 11, 12 as are present.

In other words, in embodiments, the division system 13 successively diverts groups of products 2 in batch form from an upstream conveying system 10 to each of the downstream conveying systems 11, 12 of the installation 100.

As will be described later, depending on the needs of the installation 100, all the downstream conveying systems of the installation 100 are not necessarily implemented at the same time. It is perfectly possible to envisage defining paths for the products 2 which do not involve the use of all of the downstream conveying systems of the installation 100.

In other words, in embodiments, the division system 13 forms groups of products 2 in batch form successively on a number of downstream conveying systems 11, 12 less than the total number of downstream conveying systems 11, 12 of the installation 100.

In embodiments, the groups of products 2 thus formed by the division system 13 comprise the same number of products 2.

In embodiments, the groups of products 2 formed by the division system 13 comprise a substantially different number of products 2, with a difference of one to five products 2 between the different groups.

For example, in embodiments in which the installation 100 comprises two downstream conveying systems 11, 12, the first group and the second group of products are formed by a substantially different number of products 2, with a difference of one to five products 2 between the first group and the second group.

According to a possible additional feature, the division system 13 is a switching system.

In embodiments, the division system 13 is a controlled deflector which successively diverts a determined number of products 2 together forming a batch onto each of the downstream conveying systems 11, 12 of the installation 100.

In embodiments in which the installation 100 comprises two downstream conveying systems 11, 12, the division system 13 therefore sends, from the upstream conveying system 10, successively and alternately, a first single-file flow of products 2 in batch form to a downstream conveying system 11, 12 and a second single-file flow of products in batch form to the other downstream conveying system 11, 12.

According to a preferred embodiment, the installation 100 for accumulating and transferring products 2 comprises a device 1 for conveying said products 2 in a single-file flow, said device 1 comprising an upstream conveying system 10, two downstream conveying systems 11, 12 emerging longitudinally in a hold zone P, and a division system for sending from said upstream conveying system 10 successively and alternately a first single-file flow of products 2 in batch form to one downstream conveying system 11, 12 and a second single-file flow of products 2 in batch form to the other downstream conveying system 11, 12, at least one output conveyor 3 of said products 2, an accumulation surface 4 for receiving the products 2 in batch form from the hold zone P, said surface 4 being situated between said conveying device 1 and said at least one output conveyor 3, and a transfer means 5 for transversely displacing at least one batch of products 2, on the one hand, from at least one of said two downstream conveying systems 11, 12 at the hold zone P to said accumulation surface 4 and, on the other hand, from said surface 4 to said at least one output conveyor 3. The length of one downstream conveying system 11 is greater than the length of the other downstream conveying system 12 between said division system 13 and the hold zone P, so that two batches of products 2 formed successively arrive substantially at the same moment at said hold zone P.

In embodiments, the division system 13 is in the form of a thrust plate which is displaced transversely to successively divert a determined number of products 2 together forming a batch onto each of the downstream conveying systems 11, 12 of the installation 100.

Each downstream conveying system 11, 12 of the installation 100 is therefore assigned a batch of products 2 successively and alternately with at least one other downstream conveying system 11, 12. The first single-file flow therefore forms a succession of batches of products 2 on a downstream conveying system 11, 12 and the at least second single-file flow forms a succession of batches of products 2 on another downstream conveying system 11, 12.

Advantageously, between the division system 13 and the hold zone P, for at least two downstream conveying systems, the length of one downstream conveying system 11 is significantly greater than the length of another downstream conveying system 12.

The difference in length between each downstream conveying system 11, 12, between the division system 13 and the hold zone P, must be sufficiently great for the initial advance of the first batch to be compensated by the additional distance to be covered on the downstream conveying system 12 for said first batch, in the course of its path from the division system 13 to the arrival of the batch in the hold zone P. In this way, the delay taken by the at least second batch, formed following the first batch by the division system 13, is compensated by the shorter path that it will travel on another downstream conveying system 11 from the division system 13 to its arrival at the hold zone P.

Preferably, the difference in length between at least two downstream conveying systems 11, 12 also takes account of the rate of the packaging line. In any case, the batches to be formed and to be transferred with a view to them being accumulated are batches of a large number of products, of at least fifteen products preferably.

More particularly, in embodiments, the difference in length between two downstream conveying systems 11, 12 lies between 0.75 and 1.25 times the length of a group of products 2 forming a batch. A group of products 2 forming a batch corresponds to a group of products 2 sent by the division system 13 on one of the downstream conveying systems 11, 12 of the installation 100. For example, for groups forming a train of twenty products 2 following the division system 13, the difference in length between two downstream conveying systems 11, 12 will lie between fifteen and twenty-five products 2, preferentially the difference in length will be twenty products 2. This difference in length depends therefore on the number of products 2 forming a batch, that is say on the length of a train of products 2 (as a function of the type of products 2 processed by the packaging line).

According to a preferential embodiment, the difference in length between two downstream conveying systems 11, 12 is equal to the length of a group of products 2 forming a batch, that is say to the length of a train of products 2.

FIG. 1 shows an embodiment in which one downstream conveying system 11 has a direct lane 110 and the other downstream conveying system 12 has an indirect lane 120. The length of the direct lane 110 is shorter than the length of the indirect lane 120. That means that the path to be covered for a batch of products 2 travelling on the downstream conveying system 12 is significantly longer, in terms of distance, than the path to be covered for a batch of products 2 travelling on the downstream conveying system 11. In this way, a first batch sent on the downstream conveying system 12 having the indirect lane 120 takes a path that is longer than a second batch sent on the downstream conveying system 11 having the direct lane 110. That way, although the batches are not sent at the same moment but successively by the division system 13 on each downstream conveyor 11, 12, said successive batches arrive at the same moment at a hold zone P. That is particularly advantageous because it allows a simultaneous transfer of two longitudinal batches of products 2, from the hold zone P to an accumulation surface 4.

The installation 100 also comprises at least one output conveyor 3 of the products 2, and an accumulation surface 4 for receiving the products 2 in batch form from the hold zone P. The accumulation surface 4 is situated between the conveying device 1 and the at least one output conveyor 3.

Further, the accumulation surface 4 is situated between the at least two downstream conveying systems 11, 12, at the hold zone P, and at least one output conveyor 3. The accumulation surface 4 makes it possible to manage the differences between the flows from two successive stations of the packaging line between which it is positioned and which then has an appropriate accumulation capacity.

The accumulation surface 4 has a rectangular form, the products 2 being supplied to it from one of its sides, and being taken from the other side, preferably from the opposite side.

The accumulation surface 4 receives products 2 in longitudinal batch form, to absorb the continuous flow of products 2 coming from the upstream conveying system 10.

Figure 2:
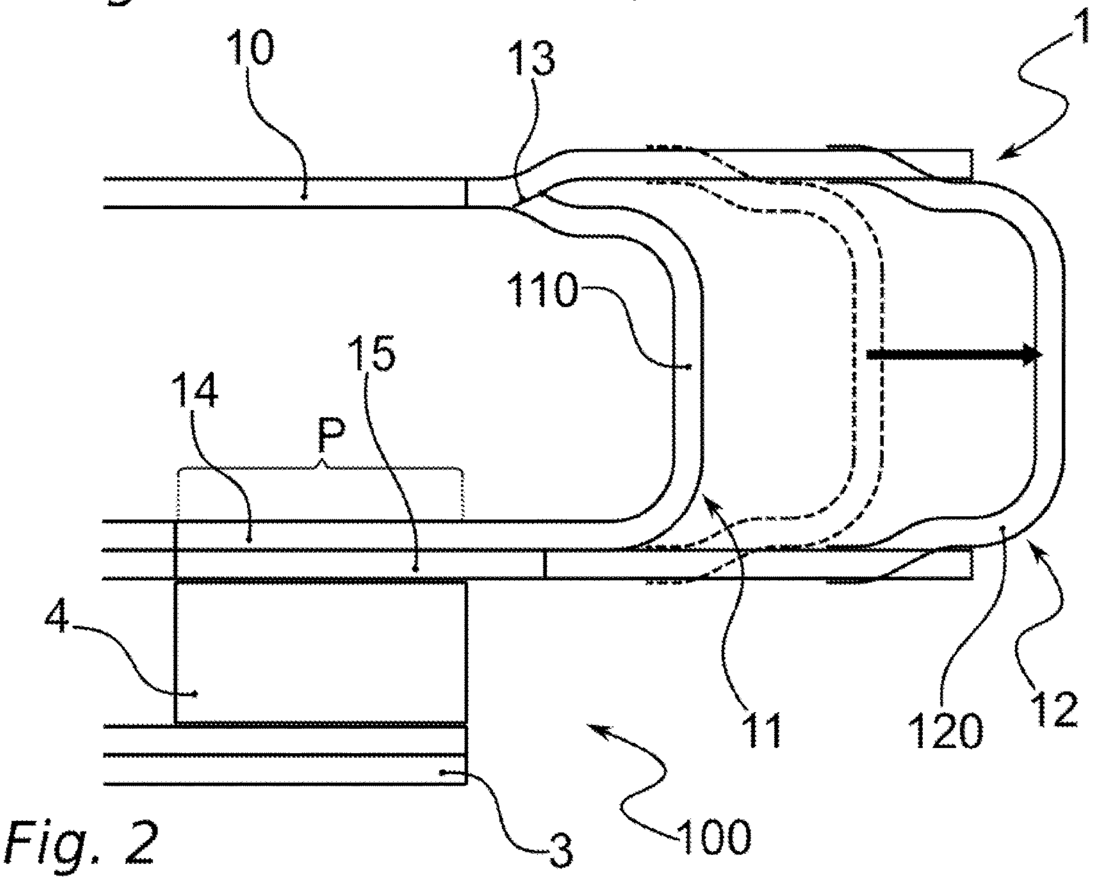
FIG. 2 schematically represents a top view of an embodiment of an installation, notably showing a portion of indirect lane that is moveable in a longitudinal direction along the conveying portion, so as to set the total length of said indirect lane.

The accumulation surface 4 is therefore supplied from the at least two downstream conveying systems 11, 12 at the hold zone P. Advantageously, one of the downstream conveying systems 11, 12 extends along the accumulation surface 4. More specifically, as can be seen in FIG. 2, a supply portion 14, 15 of a downstream conveying system 11, 12, borders an edge of the accumulation surface 4. This configuration allows a transverse transfer of a longitudinal batch of products 2, for example a batch formed by at least fifteen products 2 directly from at least one downstream conveying system 11, 12 to the accumulation surface 4, which favours a rapid and easy supply of said surface 4.

Preferably, the at least one output conveyor 3 extends along the opposite edge of the accumulation surface 4. In other words, preferably, one of the downstream conveying systems 11, 12 of the installation 100 extends against one edge of the accumulation surface 4 and at least one output conveyor 3 extends along the opposite edge of said surface 4, the at least two downstream conveying systems 11, 12 and the at least one output conveyor 3 therefore extending parallel and bordering the accumulation surface 4.

According to a possible additional feature, that can be seen in FIG. 1 or 2, the upstream conveying system 10 extends parallel to the downstream conveying systems 11, 12 at the hold zone P.

In embodiments, at the hold zone P, the at least two downstream conveying systems 11, 12 extend longitudinally and are against one another, directly or indirectly. In other words, according to a preferred embodiment, the at least two downstream conveying systems 11, 12 extend parallel against one another directly, that is to say that there is no transit surface, or dead zone, between the at least two downstream conveying systems 11, 12 at the hold zone P. This is particularly advantageous because it favours a compact installation 100.

In a preferred embodiment, at least two downstream conveying systems 11, 12 have the same conveying direction X and the products 2 travel in the same direction.

FIG. 1 shows such an embodiment, in the case where the installation 100 comprises two downstream conveying systems 11, 12.

Advantageously, for at least two downstream conveying systems 11, 12, the downstream conveying system 12, which has the indirect lane 120, extends along one edge of the accumulation surface 4, preferably against said edge, while the downstream conveying system 11, which has the direct lane 110, extends along the downstream conveying system 12. This configuration makes it possible to reduce the footprint of the installation 100.

According to another variant, for at least two downstream conveying systems 11, 12, the downstream conveying system 11, which has the direct lane 110, extends along an edge of the accumulation surface 4, preferably against said edge, while the downstream conveying system 12, which has the indirect lane 120, extends along the downstream conveying system 11.

The accumulation surface 4 can be a dead plate or be formed by a conveyor belt, the conveying direction of which extends orthogonally with respect to the conveying direction X of the products 2 travelling on the at least two downstream conveying systems 11, 12 at the hold zone P.

FIG. 1 shows an embodiment, according to which the downstream conveying systems 11, 12 are U-shaped. In this configuration, the downstream conveying system 11, which has the direct lane 110, is in the form of a U which partly surrounds the U shape of the indirect lane 120 of the downstream conveying system 12. Thus, the conveying circuits formed by the direct lane 110 and by the indirect lane 120 are nested in one another and make it possible to limit the footprint of the installation 100. Also, that makes it possible to more accurately control, in the engineering phase, the distances of each conveying path and the effects of frictions, the forms of the two downstream conveying systems 11, 12 being similar and complementary.

It is understood that the downstream conveying systems can take different forms, for example take an overall Z form when the installation 100 is seen from above.

According to a possible additional feature, at least two of the downstream conveying systems 11, 12 of the installation have the same form or a different form, according to a top view of the installation 100.

Figure 4:
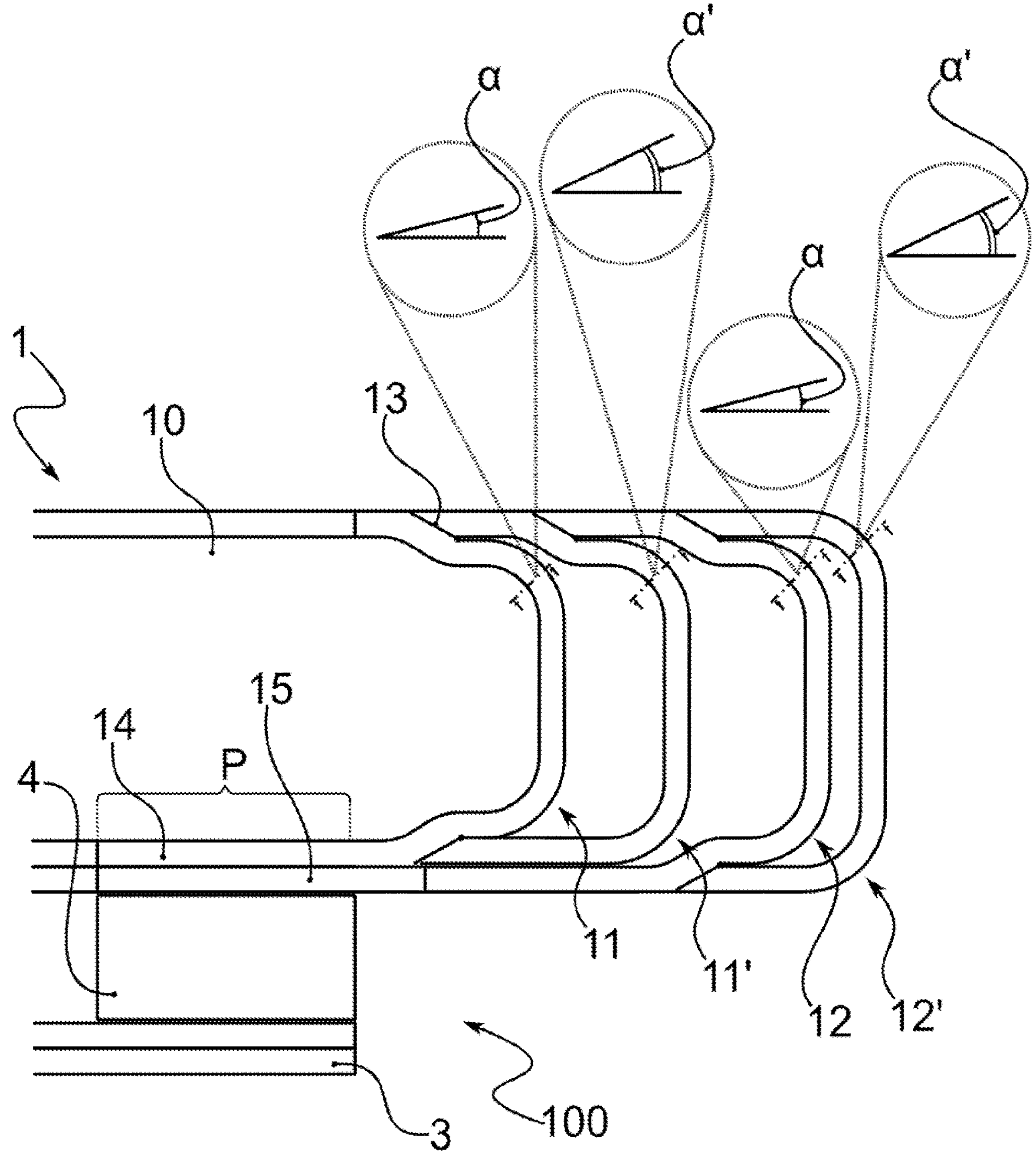
FIG. 4 schematically represents a top view of an embodiment of an installation, showing two pairs of downstream conveying systems.

According to a possible additional feature, that can be seen notably in FIG. 4, at least one downstream conveying system 11 is aligned longitudinally with the division system 13, in the extension of the upstream conveying system 10.

According to a possible additional feature, the length of at least one downstream conveying system 11, 12, between the division system 13 and the hold zone P, is adjustable. In other words, the length of the direct lane 110 and/or the length of the indirect lane 120 is adjustable. This embodiment is particularly advantageous, and contributes to the versatility of the installation 100, inasmuch as the difference in length for at least two downstream conveying systems 11, 12 has to allow the synchronization of the batches of products 2 in the hold zone P. Thus, in case notably of a change of type of products 2 or of rate, or even of length of batches of products 2, it is possible to adjust the difference in length between at least two downstream conveying systems 11, 12.

In embodiments, the length of at least one downstream conveying system 11, 12, between the division system 13 and the hold zone P, is adjustable by removably fixing the direct lane 110 and/or said indirect lane 120 at different points of the downstream conveying system 11, 12 between the division system 13 and the hold zone P. According to a nonlimiting embodiment, the direct lane 110 and/or the indirect lane 120 has, at least one end, fixing means, to be fixed onto supports provided for this purpose, at different locations on the runners of the downstream conveying systems 11, 12. Various configurations are known such as means for switching the transport lanes for the products 2 and adjusting conveyor belt lengths, for example in the patent application EP3786093 or even in the patent EP2451732B1.

FIG. 2 illustrates an embodiment according to which the length of the indirect lane 120 of the downstream conveying system 12 is adjustable. The downstream conveying system 12 has, between the division system 13 and the hold zone P, a length that can be adjusted as a function of the needs of the packaging line. In particular, it is advantageous to be able to modify the length of the conveying path as a function of the rate of production of the products 2 to be processed.

FIG. 2 shows an example according to which the lane in dotted lines has been displaced to the right, in order to prolong the path length of the products 2 sent by the division system 13 to the downstream conveying system 12. Thus, the indirect lane 120 comprises fixing means, to be fixed onto supports placed at different points of the downstream conveying system 12, after the division system 13 and before the hold zone P, so as to reduce or extend the distance to be covered for the products 2 travelling in the form of successive batches. That allows for a great degree of versatility of the installation 100, which can be adapted to different rates and therefore manage, transfer and accumulate products 2 coming in a continuous flow from an upstream conveying system 10 with an optimized cycle time.

Furthermore, the fact of having lanes whose length is adjustable advantageously makes it possible to adapt the length of each batch of products 2, that is to say adapt the number of products 2 forming a batch as a function of the length of each downstream conveying system 11, 12 of the installation 100.

This versatility can also be obtained according to other embodiments. Indeed, as described previously, in embodiments, the installation 100 comprises a plurality of downstream conveying systems 11, 12.

In embodiments, the installation 100 implements the different downstream conveying systems 11, 12 to make the products 2 coming from the upstream conveying system 10 travel.

Further, between the division system 13 and the hold zone P, the length of a downstream conveying system 12 is greater than the length of at least one other downstream conveying system 11.

Preferably, for at least two downstream conveying systems 11, 12, between the division system 13 and the hold zone P, the length of one downstream conveying system 12 is greater than at least one other downstream conveying system 11, the extra length of the downstream conveying system corresponding to a length of between 0.75 and 1.25 times the length of a train of products 2, that is to say of a group of products 2 formed by the division system 13.

Figure 3:
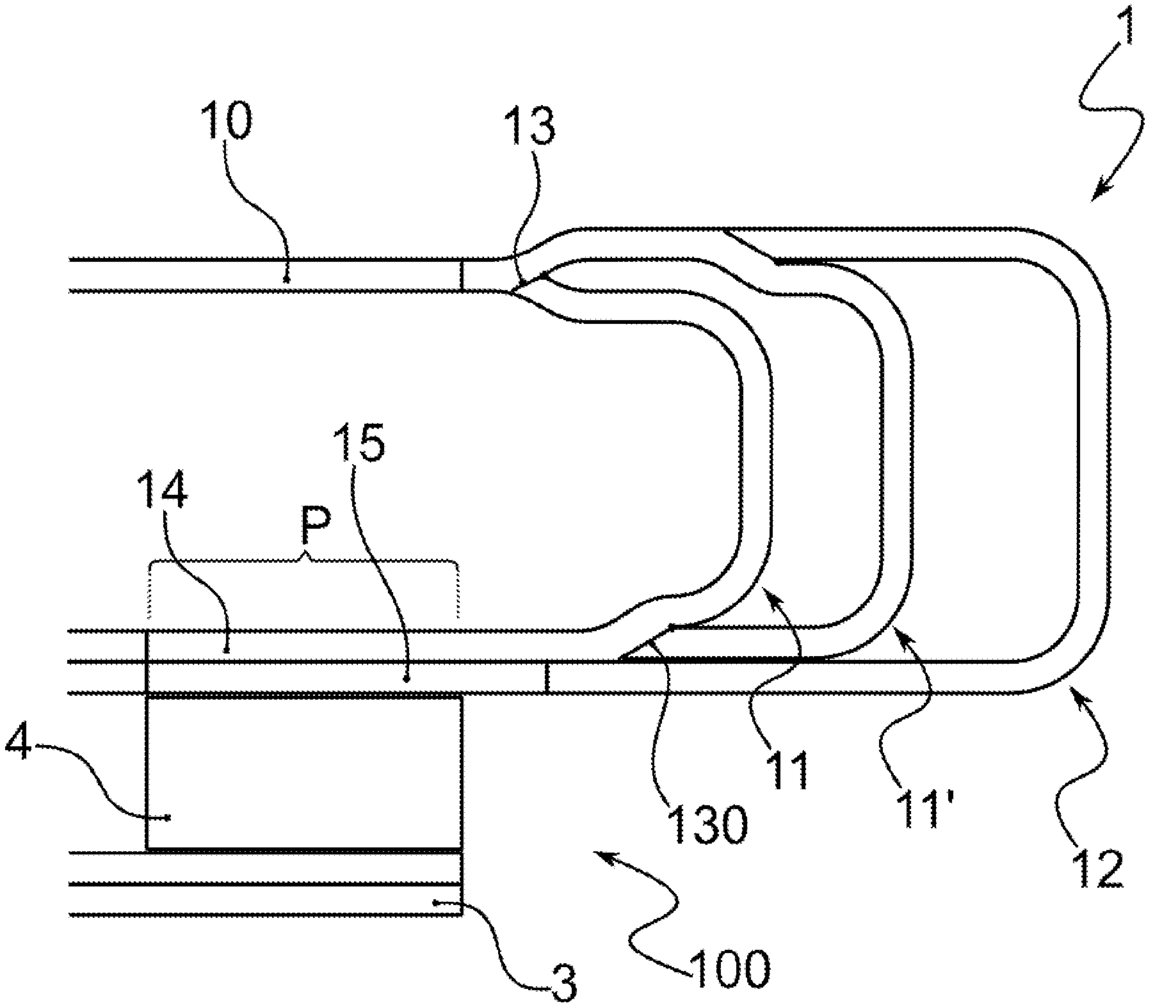
FIG. 3 schematically represents a top view of an embodiment of an installation, showing three downstream conveying systems.

FIG. 3 illustrates an embodiment according to which the installation comprises three downstream conveying systems 11, 11' and 12, each of the three downstream conveying systems 11, 11' and 12 having a different length.

In this configuration, the division system 13 can form a first single-file flow in the form of batches of products 2 on the conveying system 12, a second single-file flow in batch form on the conveying system 11', and a third single-file flow on the downstream conveying system 11. This order of sending is purely illustrative.

According to a possible additional feature, the installation 100 does not implement all of the downstream conveying systems 11, 12 to make the products 2 coming from the upstream conveying system 10 travel. In other words, depending on the needs of the installation, such as the type of product 2, or even the rate of production, the installation 100 implements only a part of the plurality of the downstream conveying systems 11, 12.

Thus, to go back to the example of FIG. 3, the division system 13 can form successive batches of products 2 for example on only two of the downstream conveying systems 11, 11' and 12. In other words, single-file flows of products 2 will only be sent successively and alternately on the downstream conveying systems 11, 12, or on the downstream conveying systems 11', 12, or even on the downstream conveying systems 11, 11', and do so according to the needs of the installation 100, and in particular according to the type of product 2.

For this, in embodiments, the installation 100 comprises a movable guiding system 130, in the form notably of a plate, in order to accompany the products 2 at their arrival in the hold zone P.

Type of product 2 is understood to mean characteristics linked to the nature of the product, for example the material (glass, PET, cardboard) of the product 2, or even its form, its dimensions or its weight.

According to an illustrative example, that can be seen in FIG. 4, the installation 100 comprises two pairs of downstream conveying systems 11, 12, 11', 12', each of the downstream conveying systems having a different length. Based on the needs of the installation 100, one pair of downstream conveying systems is implemented as a function of the type of product 2 to be processed. In other words, the division system 13 sends products 2 in batch form successively and alternately on two downstream conveying systems 11, 12, 11', 12' of a same pair.

Indeed, it can be advantageous to modify the path lengths of batches of products 2 travelling between the division system 13 and the hold zone P, as a function notably of the rates of production or of the types of products 2. That makes it possible to best synchronize the arrival of the batches of products 2 in the hold zone P, so that said batches arrive substantially at the same moment, which facilitates the transfer thereof onto the accumulation surface 4.

As illustrated in the different figures, a downstream conveying system 11, 12 has straight sections and curved sections on the horizontal plane.

According to a possible additional feature, a downstream conveying system 11, 12 is single-file or multi-file at the hold zone P.

In embodiments, at least one downstream conveying system 11, 12 comprises lateral guides for guiding the products 2 and preventing them from dropping, notably in the curved portions and turns. Preferably, these lateral guides are adjustable in width to be able to be adapted to the type of products 2.

In embodiments, a downstream conveying system 11, 12 has an angle of inclination with respect to the horizontal plane at a curve or turn in order to counter the effects of the centrifugal force on the products 2. In other words, all or part of a curve of a downstream conveying system 11, 12 has an angle of inclination with respect to the horizontal plane forming a slope that decreases transversely in the conveying direction X. In short, the highest point is located on the outside of the turn and the lowest point on the inside of the turn. Thus, according to different embodiments, the conveying device 1 may not have lateral guides, without the products 2 dropping. Furthermore, the absence of lateral guides makes it possible to avoid frictions, which can provoke slowing-downs of the products 2 and consequently cause problems of synchronization of the arrival of the batches in the hold zone P.

Depending on the type of products 2, the rates of production and depending on the radius of curvature of the turn or of the curved section, the force applied to said products 2 in the curves and turns is different. Thus, the fact of having several downstream conveying systems 11, 12 makes it possible to mitigate this problem by proposing different configurations.

Thus, according to an additional possible feature, the installation 100 comprises at least two pairs of downstream conveying systems 11, 12, 11', 12'. For each pair of downstream conveying systems, each of the downstream conveying systems has an angle of inclination a that is different with respect to the horizontal plane, this angle of inclination a being between 0 and 30 degrees, preferably between 5 and 15 degrees. That advantageously makes it possible to implement one or the other pair of downstream conveying systems as a function of the type of products 2.

According to one embodiment, the angle of inclination $\alpha$ of one downstream conveying system 11, 12 is greater than the angle of inclination $\alpha$ of another downstream conveying system 11', 12', or vice versa.

This embodiment is illustrated in FIG. 4, where two pairs of downstream conveying systems 11, 12, 11', 12' can be seen. In this embodiment, preferably, only one pair of downstream conveying systems is implemented, according to the needs of the installation 100.

In embodiments, the installation 100 comprises a movable guiding system 130, for accompanying the products 2 upon their arrival in the hold zone P.

The transfer of the products 2 at the hold zone P, from at least one downstream conveying system 11, 12 to the accumulation surface 4, is done using a transfer means 5 which displaces the products 2 by longitudinal batch, in a direction of movement which is transversal to the conveying direction X of the at least two downstream conveying systems 11, 12 at the hold zone P.

It is understood that a batch of products 2 transferred from the hold zone P to the accumulation surface 4 corresponds to a batch of products 2 formed by the division system 13. In other words, all the products 2 sent on one of the downstream conveying systems 11, 12 of the installation by the division system 13 in batch form are then transferred from the hold zone P to the accumulation surface 4.

Figure 5:
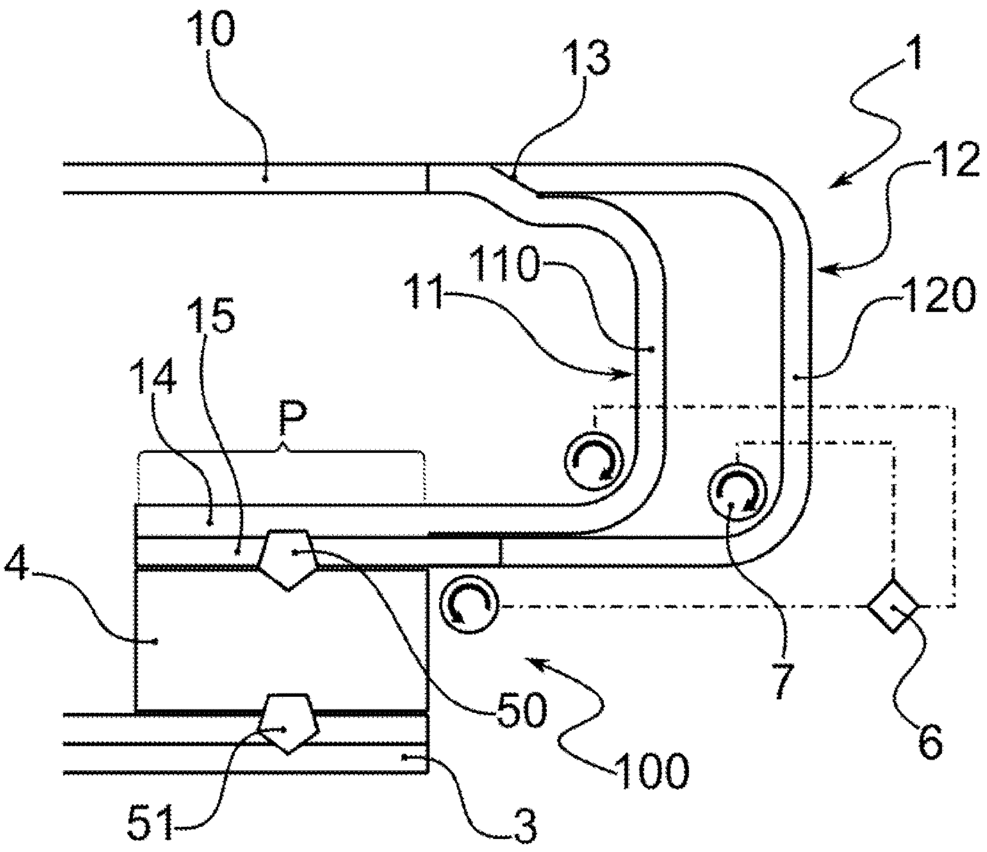
FIG. 5 schematically represents a top view of a second embodiment of an installation, notably showing a downstream conveying system aligned parallel with the upstream conveying system.

In embodiments, the installation 100 comprises a transfer means 5, said transfer means 5 comprising an input means 50 and an output means 51. This embodiment is illustrated in FIG. 5. The input means 50 perform the transfer from at least one downstream conveying system 11, 12, at the hold zone P, to the accumulation surface 4. This supply movement is preferably a movement of thrusting of at least one group of products 2 in longitudinal batch form from a fetching conveying system 11, 12, at the hold zone P, to the accumulation surface 4.

The input means 50 and the output means 51 are designed preferentially to extend all along an outer side of the batch of products 2 to be transferred.

According to an additional technical feature, the transfer means 5 is movable vertically and is retracted after the transfer of the products 2, to revert to its initial position in the hold zone, and therefore to pass over products 2 which travel on the downstream conveying systems 11, 12.

According to a possible additional feature, the transfer means 5 comprises at least two walls for simultaneously transferring, from the hold zone P to the accumulation surface 4, at least two longitudinal batches of products 2, each of the batches being situated on one of the downstream conveying systems 11, 12. In other words, the transfer means 5, and in particular the input means 50, grasps a batch of products 2 on the downstream conveying system 11 and a batch of products 2 on the downstream conveying system 12, and if necessary a batch of products 2 on at least one other downstream conveying system, to transfer them simultaneously to the accumulation surface 4.

Thus, in cases where the installation 100 comprises two downstream conveying systems 11, 12, the input means 50 simultaneously transfers two batches of products 2 from the hold zone P to the accumulation surface 4.

Advantageously, the transfer means 5 comprises at least three vertical plates, one of the plates serving as a protection plate to avoid the dropping of products 2 in their transverse transfer in batch form.

On the accumulation surface 4, the batches of products 2 form rows. The output means 51 performs the transfer from the accumulation surface 4 to at least one output conveyor 3. The output means 51 can transfer one or more batches of products 2, that is to say one or more rows, simultaneously. Indeed, the output conveyor 3 can be single-file or multi-file. The output can also comprise several output conveyors 3, for example two output conveyors 3, as can be seen in FIG. 1.

Figure 6:
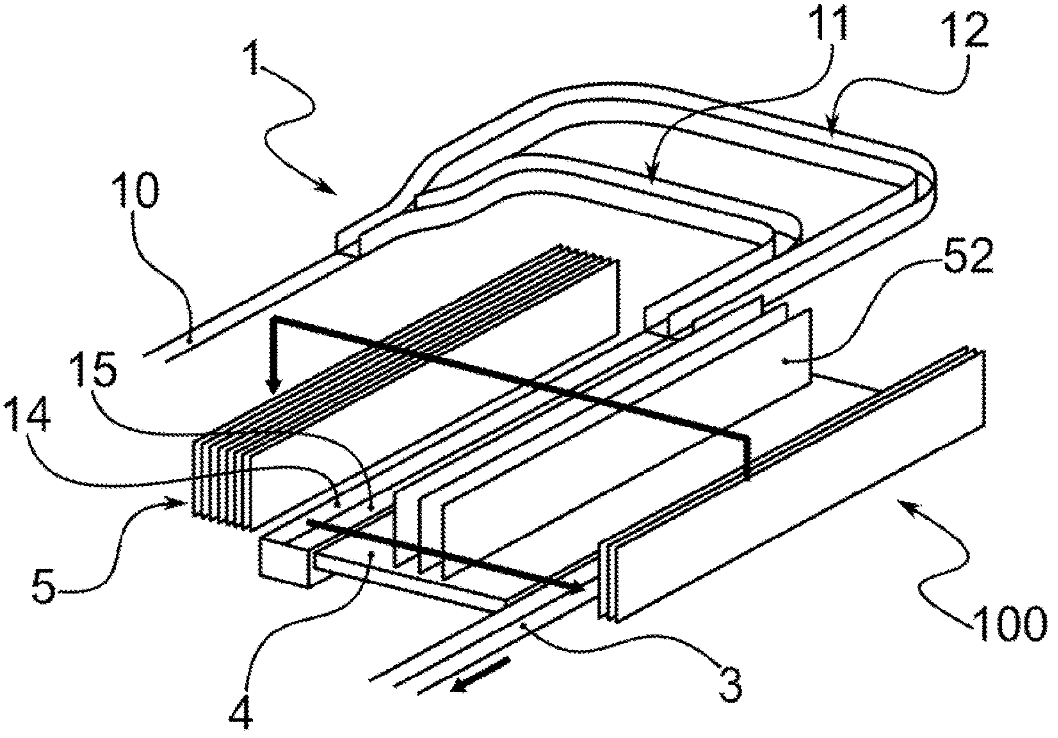
FIG. 6 schematically represents a perspective view of an embodiment of an installation, notably showing a transfer means in the form of a plurality of thrusters.

In embodiments, as can be seen notably in FIG. 6, the transfer means 5 comprises a plurality of thrusters 52. Each thruster 52 accompanies at least one batch of products 2 from a downstream conveying system 11, 12 at a hold zone to at least one output conveyor 3. In other words, each thruster 52 is displaced from the hold zone P to at least one output conveyor 3, and therefore entirely crosses the accumulation surface 4, from one edge to another.

This feature is very advantageous because it makes it possible to limit the risk of dropping of the products 2, a single thruster 52 accompanying at least one batch of products 2 from the input of the accumulation surface 4 to its output.

In embodiments, the downstream conveying systems 11, 12 of the installation 100 have the same drive system. In fact, for at least two downstream conveying systems 11, 12, the difference in length between the downstream conveying systems 11, 12 makes it possible to synchronize the arrival of the successive batches of products 2, such that a batch of products 2 travelling on the downstream conveying system 12, via the indirect lane 120, arrives at the same moment as, substantially simultaneously with, a batch of products 2 travelling on the downstream conveying system 11, via the direct lane 110. Thus, the two downstream conveying systems 11, 12 can have the same conveying speed, and the difference in length of the direct lane 110 and of the indirect lane 120 on its own allows the synchronization of the arrival of the batches of products 2 on each of the downstream conveyors 11, 12.

A drive system comprises at least one motor 7. A drive system comprises one or more motors 7. Indeed, depending on the length of a conveying system, it may be necessary to use several motors 7. Furthermore, a single motor 7 can drive different conveying belts.

In embodiments, a motor 7 can comprise different clutches to drive different conveying belts.

According to a possible additional feature, each of the downstream conveying systems 11, 12 has at least one motor 7 which is specific to it.

In embodiments, the installation 100 also comprises a control unit 6, represented schematically in FIG. 5. The control unit 6 controls the speed of conveying of at least one of the downstream conveying systems 11, 12 to synchronize the arrival of the first and at least second single-file flows of products 2 in batch form at the hold zone P.

Advantageously, the control unit 6 comprises different sensors, notably speed sensors, and a database in which are stored various information concerning the packaging line. For example, the database of the control unit 6 stores the conveying speed parameters of the at least two downstream conveying systems 11, 12, of the upstream conveying system 10, and of the at least one output conveyor 3. The database can also comprise information on the nature of the products 2 to be processed on the packaging line. The database is stored in a memory device of the control unit 6 or stored on an independent server.

According to a possible additional feature, the control unit 6 is also linked to the division system 13, in order to accurately know the time-related information of the passage of each product 2 of each batch on each of the downstream conveying systems 11, 12, for example via the use of a passage sensor.

The control unit 6, based on the data stored in the database, and/or based on data obtained by the different sensors, is able to estimate the moment of arrival in the hold zone P of the first single-file flow and of the at least second single-file flow of products 2 that are passed by the division system 13.

The control unit 6 is therefore linked to the different elements of the installation 100, and in particular to at least one drive system of the downstream conveying systems 11, 12. It can be linked by wire or not, by any communication means well known to the person skilled in the art.

Further, according to a possible additional feature, at least one downstream conveying system 11, 12 comprises two conveyor belts, one following the other, each of the two belts having a drive motor 7 which is specific to it, so that the conveying speeds of the two belts of a same downstream conveying system 11, 12 can be different. That advantageously makes it possible to be able to stop or slow down the products 2 arriving in the hold zone P on a downstream conveying system while allowing the division system 13 to distribute products 2 in batch form on the other conveyor belt of the downstream conveying system while even so stopped in the hold zone. In this way, it is possible to continuously supply the downstream conveying systems 11, 12 and the flow of the upstream station is not affected, and the performance of the product 2 packaging line is not impacted. Furthermore, the products 2 are transferred in batch form in total safety, not undergoing any impact. In fact, a transverse transfer at full speed in the hold zone P cannot be envisaged.

In embodiments, a downstream conveying system 11, 12 comprises two conveyor belts, one following the other, powered by a same drive motor 7 which comprises two transmissions, so that the conveying speeds of the two belts of a same downstream conveying system 11, 12 can be different.

According to a possible additional feature, the two belts of the at least one downstream conveying system 11, 12 are joined end-to-end and aligned longitudinally.

In embodiments, the join between two successive and aligned belts of a downstream conveying system 11, 12 is made by a transfer plate. The use of such a transfer plate is particularly useful when the products 2 are containers. However, this transfer plate is not always necessary, notably when the products 2 are boxes, or products 2 of great stability.

According to another variant, the two belts of the downstream conveying system 11, 12 are not aligned longitudinally, but offset with respect to one another. In this case, the downstream conveying system 11, 12 comprises a guide, in the form of at least one guiding runner, for accompanying the passage of the products 2 from one belt to the other of said downstream conveying system 11, 12.

In embodiments, the downstream conveying system 11 comprises two conveyor belts, one conveyor belt in the form of a supply portion 14, at the hold zone P; and one conveyor belt in the form of the direct lane 110, the supply portion 14 and the direct lane 110 each having a drive motor 7 which is specific to it.

In embodiments, the downstream conveying system 12 comprises two conveyor belts, one conveyor belt in the form of a supply portion 15, at the hold zone P, and one conveyor belt in the form of an indirect lane 120, the supply portion 15 and the indirect lane 120 each having a motor 7 which is specific to it.

FIG. 5 shows an embodiment according to which, for two downstream conveying systems 11, 12, the downstream conveying system 11 is powered by a drive system comprising a single motor 7, while the downstream conveying system 12 comprises a drive system comprising two motors 7, one motor 7 for powering the indirect lane 120 and one motor 7 for powering the supply portion 15 at the hold zone P. This embodiment advantageously allows the downstream conveying system 12 to have different conveying speeds at the supply portion 15 and at the indirect lane 120. In particular, that makes it possible to both avoid a stoppage of the packaging line and the use of a dead plate or waiting zone, in the transfer of the products 2 from the hold zone P to the accumulation surface 4. Indeed, it is possible, without any difficulty, to slow down or even stop the products 2 which emerge at the hold zone P on the downstream conveying systems 11, 12, while supplying the indirect lane 120 with products 2 via the division system 13. The control of the different conveying speeds is preferably performed by the control unit 6.

This example is purely illustrative and nonlimiting.

The invention relates also to a method for accumulating and transferring products 2 in a packaging line. The method according to the invention comprises the following steps:

- receiving a single-file flow of products 2 at an upstream conveying system 10, then;
- distributing the single-file flow of products 2 successively on at least two downstream conveying systems 11, 12 in longitudinal batch form;
- bringing said batches into a hold zone P using the downstream conveying systems 11, 12;
- slowing down said at least two downstream conveying systems 11, 12 at the hold zone P to slow down the products 2 therein;
- transferring a batch of products 2 from at least one downstream conveying system 11, 12 at said hold zone P to said accumulation surface 4;
- transferring at least one batch of products 2 from said accumulation surface 4 to at least one output conveyor 3.

The method is characterized in that, for at least two downstream conveying systems 11, 12, the path to bring a batch into the hold zone P is longer for one downstream conveying system 11, 12 than for the other downstream conveying system 11, 12.

In embodiments, the method for accumulating and transferring products 2 in a packaging line comprises the following steps:

- receiving a single-file flow of products 2 at an upstream-conveying system 10, then;
- distributing the single-file flow of products 2 alternately and successively on two downstream conveying systems 11, 12 in longitudinal batch form;
- bringing said batches into a hold zone P using the downstream conveying systems 11, 12;
- slowing down said downstream conveying systems 11, 12 at the hold zone P to slow down the products 2 therein;
- transferring a batch of products 2 from at least one downstream conveying system 11, 12 at said hold zone P to said accumulation surface 4;
- transferring at least one batch of products 2 from said accumulation surface 4 to at least one output conveyor 3, the method being characterized in that:

the path to bring a batch into the hold zone P is longer for one downstream conveying system 11, 12 than for the other downstream conveying system 11, 12, to synchronize the arrival in the hold zone P of two successive batches, each travelling respectively on a downstream conveying system 11, 12.

Different steps of the method will now be described using the FIGS. 7 to 11, for an installation 100 which comprises two downstream conveying systems 11, 12, it being understood that the same method applies for installations 100 which comprise at least three downstream conveying systems 11, 12.

Figure 7:
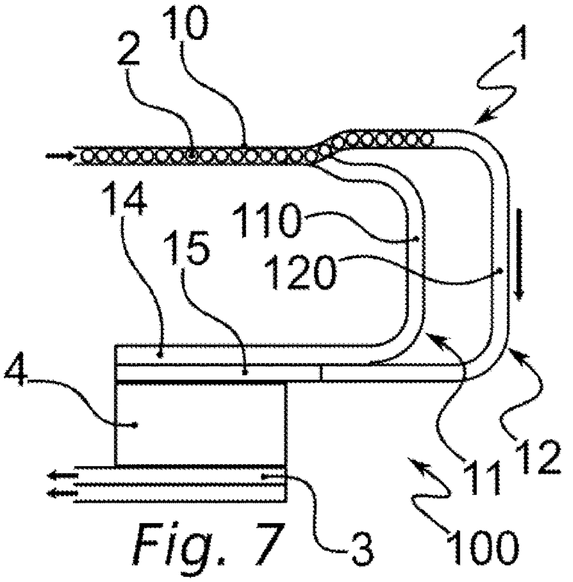
FIG. 7 schematically represents a top view of the installation in the implementation of a product accumulation method, showing a step of said method, in which a first single-file flow of products is diverted to an indirect lane.

FIG. 7 shows the step of distribution of the single-file flow of products 2 to a downstream conveying system 12 which has an indirect conveying lane 120. The division system 13 therefore diverts a first single-file flow of products 2 in batch form coming from the upstream conveying system 10 to the longer downstream conveying system 12. It is perfectly possible to envisage having the division system 13 firstly divert the single-file flow of products 2 to the shorter downstream conveying system, and this example is purely illustrative and nonlimiting.

A longer downstream conveying system 12 means that the distance to be covered for a group of products 2 in batch form on said downstream conveying system 12, via the indirect lane 120, is significantly longer than the distance to be covered for a group of the product 2 in batch form on the other downstream conveying system 11, via the direct lane 110.

The term length therefore expresses a length in terms of distance and not in terms of duration.

In preferred embodiments, the difference in length between at least two downstream conveying systems 11, 12 is between 0.75 and 1.25 times the length of a train of products 2, corresponding to the length of a batch of products 2 formed by the division system 13 and sent on one of the downstream conveying systems 11, 12 of the installation 100.

Figure 8:
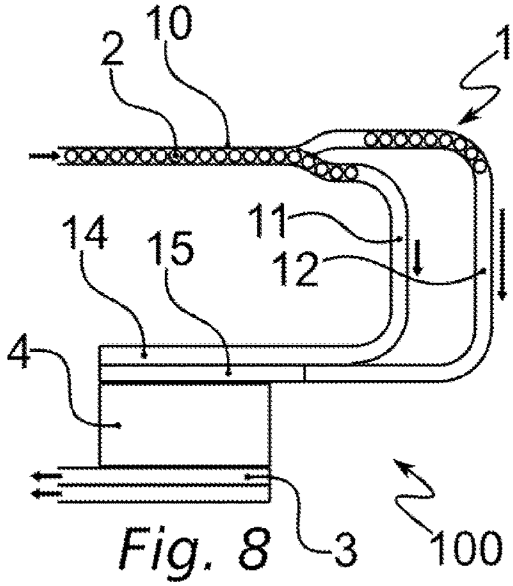
FIG. 8 schematically represents a view similar to FIG. 7, showing a step of said method, in which a second single-file flow of products in batch form is diverted to a direct lane, while the first single-file flow of products runs along the indirect lane.

FIG. 8 illustrates the same step of distribution of the single-file flow of products 2, the division system 13 directing a second single-file flow of products 2 in batch form coming from the upstream conveying system 10 to the shorter downstream conveying system 11. In the same way as previously, it is perfectly possible to envisage having the division system 13 secondly divert the single-file flow of products 2 to the longer downstream conveying system, and this example is purely illustrative and nonlimiting.

It is therefore understood that the first single-file flow of products 2 has been sent on the downstream conveying system 12 first, and that the first product 2 of the first batch is diverted by the division system 13 significantly earlier than the first product 2 of the second batch. At the moment of creation of the batches by the division system 13, the distance deviation which separates the arrival of a first product of each batch in the hold zone P is considerable, and the first batch formed by the first single-file flow of products 2 is in advance, at the very least in chronological terms, of the second batch formed by the second single-file flow.

It is understood that, in the case where the installation 100 comprises at least three downstream conveying systems 11, 12, and in which all of the downstream conveying systems 11, 12 are in operation, the division system 13 successively sends a single-file flow of products 2 in batch form on each of the downstream conveying systems 11, 12, each of the batches of products 2 covering a path of a different distance, in such a way that the batches of products 2 formed successively, and travelling on distinct downstream conveying systems, arrive substantially at the same moment in the hold zone P.

Figure 9:
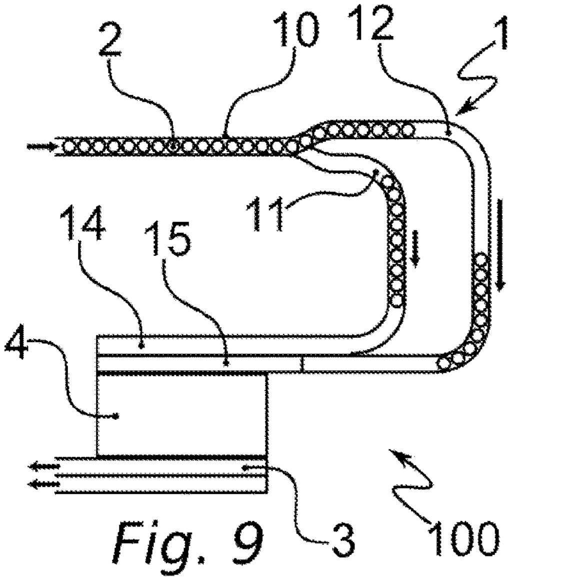
FIG. 9 schematically represents a view similar to FIG. 7, showing a step of said method, in which the first and second single-file flows of products run along direct and indirect lanes while a third single-file flow of products is switched to the indirect lane, FIG. 10 schematically represents a view similar to FIG. 7, showing a step of said method, in which the first and second single-file flows of products arrive at the same time at a hold zone of the installation.

FIG. 9 illustrates a novel step of distribution of the single-file flow of products 2. For the purposes of understanding, it is recalled that an operation is described here for two downstream conveying systems 11, 12, but the same principle works regardless of the number of downstream conveying systems 11, 12 in operation.

In this step, the division system 13 successively and alternately diverts groups of a determined number of products 2 in batch form, to one or other of the downstream conveying systems 11, 12. This step is performed without interruption and the single-file flow of products 2 is continuous. It can be seen in FIG. 9 that the distance deviation which separates the arrival in the hold zone P of the batches of products 2 travelling on each downstream conveying system 11, 12 is reduced with respect to FIG. 8, each batch of products 2 having already covered a good part of its path to be followed between the division system 13 and the hold zone P. In other words, the second batch of products 2, formed by the second single-file flow, has begun to catch up its delay on the first batch of products 2.

Figure 10:
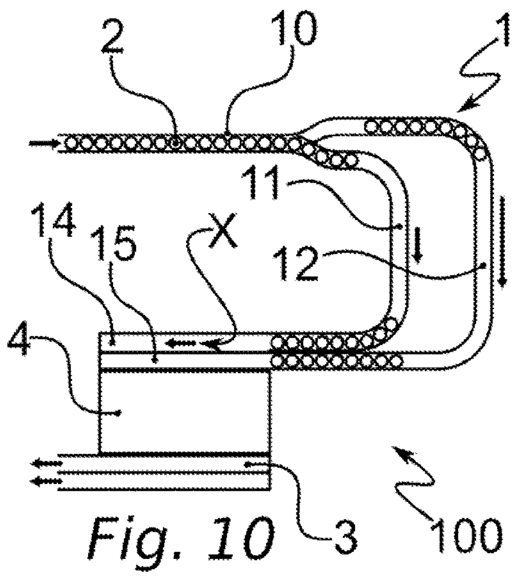

FIG. 10 shows a new diversion of the flow to the downstream conveying system 11. The batches of products 2, formed successively by the division system 13, arrive in the hold zone P at the same moment. In particular, the first product 2 of each batch arrives at the same moment in the hold zone P, each respectively on a downstream conveying system 11, 12, at a supply portion 14, 15.

Figure 11:
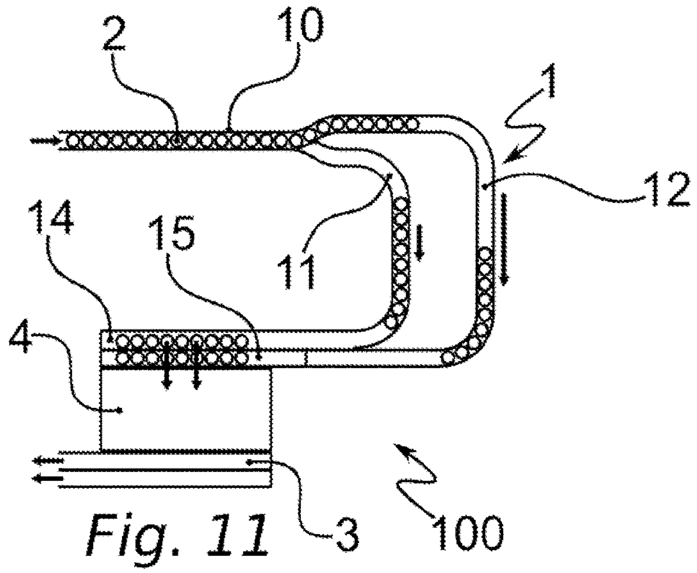
FIG. 11 schematically represents a view similar to FIG. 7, showing a step of said method, in which the first and second single-file flows in product batch form are transferred simultaneously from the two downstream conveying systems to the accumulation surface.

FIG. 11 shows an embodiment according to which the transfer step comprises the simultaneous transfer of a batch of products 2 from each of the downstream conveying systems 11, 12. To do this, the products 2 are slowed down in the hold zone P, in the downstream conveying systems 11, 12, possibly until complete stoppage, by reducing the speed of the downstream conveying systems 11, 12 in the hold zone P with a deceleration which avoids products 2 being dropped. The products 2 are slowed down at the input of the hold zone P and arrive stopped or travelling at a very low speed at said hold zone.

Advantageously, in embodiments, at least one of the downstream conveying systems 11, 12 has two successive conveyor belts, each of the two belts having a motor 7 which is specific to it. That then makes it possible to slow down the products 2 emerging in the hold zone P on the supply portion 14, 15, while the direct lane 110 or the indirect lane 120 travels at a conveying speed allowing the division system 13 to divert the products in batch form onto one or other of the lanes 110, 120.

In other words, the division system 13 forms batches and the downstream conveying systems 11, 12 are in operation at the direct and indirect lanes 110, 120, while the products 2 are immobile or quasi-immobile at the hold zone P.

According to a preferred embodiment, the downstream conveying system 12 comprises two successive conveyor belts, one belt in the form of the indirect lane 120 and one belt in the form of a supply portion 15. The downstream conveying system 11 comprises a single conveyor belt, that is to say that the two successive portions formed by the direct lane 110 and the supply portion 14 travel at the same conveying speed. In this configuration, and advantageously, the products 2 arriving in batch form are slowed down when they emerge at the same moment in the hold zone P, both on the supply portion 14 and on the supply portion 15. The products 2 are slowed down, preferentially until they are stopped. While awaiting the restarting of the downstream conveying system 11, the division system 13 can send the products 2 on the downstream conveying system 12, inasmuch as said downstream conveying system 12 comprises two successive conveyor belts, each having a motor 7 which is specific to it.

It is also possible to envisage the downstream conveying systems 11, 12 having a common motor 7 for the supply portions 14, 15 and two motors 7, one motor 7 for each of the direct 110 and indirect 120 lanes, between the division system 13 and the hold zone P.

Advantageously, the control of the drive systems and/or of the motors 7 is done by a control unit 6. The control unit 6 synchronizes the conveying speeds of the downstream conveying systems 11, 12, preferentially the conveying speeds of the supply portions 14, 15 and of the direct 110 and indirect 120 lanes.

In embodiments, the downstream conveying systems 11, 12 are U-shaped and each have a drive motor 7 which is specific to it.

Following their arrival in the hold zone P, the products 2 in batch form are then transferred to the reception surface 4. This transfer can be done by a movement of sweep type or even by grasping the products 2 using a gripping cap which grips them by the top, then brings them transversely to the reception surface 4. A cycle of reception of products 2, of slowing down, of transfer, is repeated for the downstream conveying systems 11, 12, the reception on each of the downstream conveying systems 11, 12 of the installation 100 being done substantially at the same moment, by virtue of the differences in path length to be covered. The configuration is therefore relatively simple and the cycle times are efficient.

The method also comprises a step, not represented, of transfer of at least one batch of products 2 from the accumulation surface 4 to at least one output conveyor 3.

In embodiments, the products 2 are transferred from the hold zone P to the input of the accumulation surface 4. Advantageously, the accumulation surface 4 comprises a conveyor belt and the products 2 are then displaced from one edge to the other of the accumulation surface 4, in order to be discharged on at least one output conveyor 3.

In any case, the products 2 taken out are released either in single-file mode or in multi-file mode. Indeed, it is perfectly possible, in the case of a configuration in which the upstream station delivers the products 2 in a single file and the downstream station needs products 2 in multiple files, to let the longitudinal batches of products 2 accumulate against one another at the output side of the accumulation surface 2, then to simultaneously remove several longitudinal batches, alongside one another along a direction transversal to the conveying direction X. The products 2 are released from the accumulation surface 4 once again transversely in the conveying direction X that they take downstream, which means that the batches of products 2 extracted from the accumulation surface successively form longitudinal sections of the flow downstream of the accumulation surface 4.

The accumulation and transfer method according to the invention makes it possible to reduce the cycle times between two successive transfers, and therefore provides an improvement to the performance of the packaging line.

In embodiments, the transfer between, on the one hand, at least one downstream conveying system 11, 12 at the hold zone P to the accumulation surface 4 and, on the other hand, from said surface 4 and at least one output conveyor 3 is performed by a transfer means 5, said transfer means 5 comprising a plurality of thrusters 52. Each thruster 52 transfers at least one batch of products 2 from at least one downstream conveying system 11, 12 at the hold zone P to the accumulation surface 4, then, after having crossed said surface 4, said thruster 52 transfers said at least one batch of products 2 from said surface 4 to at least one output conveyor 3.

According to a possible additional feature, a thruster 52 transfers at least two batches of products 2, each batch being located on a downstream conveying system 11, 12, from the hold zone P to the accumulation surface 4, then from said surface 4 to at least one output conveyor 3. In other words, in this configuration, one thruster 52 accompanies one or more batches of products 2 from the input to the output of the accumulation surface 4.

In embodiments, at least two successive batches of products 2, each having travelled on one of the downstream conveying systems 11, 12, arrive at the same time in the hold zone P. The arrival of the at least two successive batches of products 2 is therefore synchronized. That means for example that the first product 2 of a batch having travelled on a downstream conveying system 11 arrives substantially at the same moment as the first product 2 of a batch having travelled on at least one other downstream conveying system 12, the at least two batches being passed successively by the division system 13. This is possible by virtue of the different length of the downstream conveying systems 11, 12 for at least two downstream conveying systems 11, 12. The difference in path length must be sufficiently great to allow the synchronization, especially when the at least two downstream conveying systems 11, 12 have the same conveying speed.

In particular, and preferably, the difference in path length corresponds to approximately a length of between 0.75 and 1.25 times the length of a train of products 2, that is to say of a batch of products 2 formed by the division system 13.

According to a possible additional feature, the synchronized arrival means that the first batch of products 2 having travelled on one of the downstream conveying systems 11, 12 is stopped substantially in the hold zone P at the same moment as the at least second batch of products 2 having travelled on another downstream conveying system 11, 12, so as to allow the transfer to the accumulation surface 4.

According to a preferred embodiment, the downstream conveying systems 11, 12 have the same conveying speed.

The invention advantageously makes it possible to optimize the cycles of transfer of products 2 from a hold zone P to an accumulation surface 4, by proposing an installation 100 which comprises at least two downstream conveying systems 11, 12 of different lengths. Thus, the batches of products 2 formed successively by a division system 13 arrive substantially at the same moment in the hold zone P, which allows for an optimized transfer, in a single step. Although the above description is based on particular embodiments, it is in no way limiting on the scope of the invention, and modifications can be made, notably by the substitution of technical equivalents or by the different combination of all or part of the features set out above.

The invention claimed is:

1. An installation for accumulating and transferring products comprising:

a device for conveying said products in a single-file flow, said device comprising an upstream conveying system, at least two downstream conveying systems emerging longitudinally in a hold zone, and a division system for sending from said upstream conveying system successively to one of the downstream conveying systems at least one first single-file flow of products in batch form to one of the downstream conveying systems and at least one second single-file flow of products in batch form to another of the downstream conveying systems, at least one output conveyor of said products, an accumulation surface for receiving the products in batch form from the hold zone, said surface being situated between said conveying device and said at least one output conveyor, wherein, at the hold zone, the at least two downstream conveying systems extend longitudinally and are against one another, directly or indirectly, and one of the at least two downstream conveying systems borders an edge of the accumulation surface, a transfer means for simultaneously and transversely displacing at least two batches of products from the at least two downstream conveying systems at the hold zone to said accumulation surface, and for transversely displacing at least one batch of products from said surface to said at least one output conveyor, the installation being configured such that, for the at least two downstream conveying systems, between said division system and the hold zone, the length of one downstream conveying system is greater than the length of at least one other downstream conveying system, so that at least two batches of products formed successively by the division system and sent, for one of them, on one of the downstream conveying systems and, for the other, on the other downstream conveying system, arrive substantially at the same moment at said hold zone.

2. The installation of claim 1, comprising at least three downstream conveying systems and in that each of the at least three downstream conveying systems has a different length, so that all the batches of products formed successively by the division system arrive substantially at the same moment at the hold zone.

3. The installation of claim 1, wherein the installation comprises two downstream conveying systems, and in that the division system is able to send, from said upstream conveying system, successively and alternately, a first single-file flow of products in batch form to one of the downstream conveying systems and a second single-file flow of products in batch form to the other downstream conveying system, so that two batches of products formed successively by the division system arrive substantially at the same moment at said hold zone.

4. The installation of claim 1, wherein the downstream conveying systems are U-shaped.

5. The installation of claim 1, wherein the division system is a controlled deflector which successively and alternately diverts a determined number of products together forming a batch onto the downstream conveying systems.

6. The installation of claim 1, wherein the transfer means comprises at least two walls for simultaneously transferring, from the hold zone to the accumulation surface, at least two longitudinal batches of products, each of the batches being situated respectively on one of the downstream conveying systems.

7. The installation of claim 1, wherein the transfer means comprises an input means and an output means, said input means being configured to transversely transfer a batch of products from at least one of the downstream conveying systems at the hold zone to the accumulation surface and said output means being configured to transversely transfer at least one batch of products from the accumulation surface to the at least one output conveyor.

8. The installation of claim 1, wherein the transfer means comprises a plurality of thrusters, each thruster being able to transfer a batch of products from at least one of the downstream conveying systems to the at least one output conveyor by crossing the accumulation surface.

9. The installation of claim 1, wherein the at least two downstream conveying systems each have at least one drive motor which is specific to it.

10. The installation of claim 1, wherein at least one of the downstream conveying systems comprises two conveyor belts, one following the other, each of the two belts having a drive motor which is specific to it, so that the conveying speeds of the two belts of said at least one of the downstream conveying systems can be different.

11. A method for accumulating and transferring products in a packaging line, the method comprising the following steps:

receiving a single-file flow of products at an upstream conveying system, then;

distributing the single-file flow of products successively on at least two downstream conveying systems in longitudinal batch form;

bringing said batches into a hold zone using said downstream conveying systems, wherein, at the hold zone, the at least two downstream conveying systems extend longitudinally and are against one another, directly or indirectly, and one of the at least two downstream conveying systems borders an edge of an accumulation surface;

slowing down said at least two downstream conveying systems at the hold zone to slow down the products therein;

simultaneously transferring at least two batches of products from the at least two downstream conveying systems at said hold zone to said accumulation surface;

transferring at least one batch of products from said accumulation surface to at least one output conveyor, wherein for the at least two downstream conveying systems, the path to bring a batch into the hold zone is longer for one downstream conveying system than for the other downstream conveying system, so as to synchronize the arrival in the hold zone of two successive batches, each travelling respectively on one of the downstream conveying systems.

12. The method of claim 11, wherein the transfer of a batch of products from at least one of the downstream conveying systems at the hold zone to the accumulation surface is performed by an input tool and in that the transfer of at least one batch of products from the accumulation surface to the at least one output conveyor is performed by an output tool.

13. The method of claim 11, wherein the transfer from at least one of the downstream conveying systems at the hold zone to the accumulation surface and from said surface to said at least one output conveyor, is performed by a transfer means, said transfer means comprising a plurality of thrusters, each thruster transferring at least one batch of products from at least one of the downstream conveying systems at the hold zone to said surface, having said surface crossed by said at least one batch of products and then transferring said at least one batch of products from said surface to to the at least one output conveyor.

14. The method of claim 11, wherein at least two successive batches, each having travelled on one of the downstream conveying systems, arrive at the same time in the hold zone.

15. An installation for accumulating and transferring products comprising:

a device for conveying said products in a single-file flow, said device comprising an upstream conveying system, at least two downstream conveying systems emerging longitudinally in a hold zone, and a division system for sending from said upstream conveying system successively to one of the downstream conveying systems at least one first single-file flow of products in batch form to one of the downstream conveying systems and at least one second single-file flow of products in batch form to another of the downstream conveying systems, at least one output conveyor of said products, an accumulation surface for receiving the products in batch form from the hold zone, said surface being situated between said conveying device and said at least one output conveyor, wherein, at the hold zone, the at least two downstream conveying systems extend longitudinally and are against one another, directly or indirectly, and one of the at least two downstream conveying systems borders an edge of the accumulation surface, a transfer means for simultaneously displacing at least two batches of products from the at least two downstream conveying systems at the hold zone to said accumulation surface, and for displacing at least one batch of products from said surface to said at least one output conveyor, wherein the installation is configured such that, for the at least two downstream conveying systems, between said division system and the hold zone, the length of one downstream conveying system is greater than the length of at least one other downstream conveying system, so that at least two batches of products formed successively by the division system and sent, for one of them, on one of the downstream conveying systems and, for the other, on the other downstream conveying system, arrive substantially at the same moment at said hold zone.

16. The installation of claim 15, comprising at least three downstream conveying systems and in that each of the at least three downstream conveying systems has a different length, so that all the batches of products formed successively by the division system arrive substantially at the same moment at the hold zone.

17. The installation of claim 15, comprising two downstream conveying systems, and in that the division system is able to send, from said upstream conveying system, successively and alternately, a first single-file flow of products in batch form to one of the downstream conveying systems and a second single-file flow of products in batch form to the other downstream conveying system, so that two batches of products formed successively by the division system arrive substantially at the same moment at said hold zone.

18. The installation of claim 15, wherein the downstream conveying systems are U-shaped.

* * * * *